US010386905B2

(12) United States Patent
Toba

(10) Patent No.: US 10,386,905 B2
(45) Date of Patent: Aug. 20, 2019

(54) ELECTRONIC APPARATUS, POWER SUPPLY RECEPTION METHOD IN ELECTRONIC APPARATUS, POWER SUPPLY METHOD IN ELECTRONIC APPARATUS, AND CABLE

(71) Applicant: SONY CORPORATION, Tokyo (JP)

(72) Inventor: Kazuaki Toba, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 89 days.

(21) Appl. No.: 15/124,968

(22) PCT Filed: Mar. 16, 2015

(86) PCT No.: PCT/JP2015/057768
§ 371 (c)(1),
(2) Date: Sep. 9, 2016

(87) PCT Pub. No.: WO2015/141644
PCT Pub. Date: Sep. 24, 2015

(65) Prior Publication Data
US 2017/0017282 A1    Jan. 19, 2017

(30) Foreign Application Priority Data

Mar. 19, 2014 (JP) ................................. 2014-055938

(51) Int. Cl.
*G06F 1/26*    (2006.01)
*H01R 24/28*   (2011.01)
(Continued)

(52) U.S. Cl.
CPC ............. *G06F 1/266* (2013.01); *H01R 24/28* (2013.01); *G09G 5/006* (2013.01);
(Continued)

(58) Field of Classification Search
CPC ........ G06F 1/3202; G06F 1/3231; G06F 1/26; G06F 1/206; G06F 1/3228; G06F 1/08;
(Continued)

(56) References Cited

U.S. PATENT DOCUMENTS 4,438,477 A * 3/1984 Cawley .................. H04M 3/18
361/111
6,508,678 B1 * 1/2003 Yang ...................... H01R 13/64
439/607.08
(Continued)

FOREIGN PATENT DOCUMENTS

JP    2003-216284 A    7/2003
JP    2006-019029 A    1/2006
(Continued)

*Primary Examiner* — Zahid Choudhury
(74) *Attorney, Agent, or Firm* — Chip Law Group

(57) ABSTRACT

To extend an interface function. Provided is an electronic apparatus including: a receptacle configured to connect to a plug of a cable for connecting the electronic apparatus to an external apparatus. The receptacle includes a first power supply terminal, and a second power supply terminal having a greater current capacity than a current capacity of the first power supply terminal. For example, in the receptacle, the first power supply terminal is provided on a surface of a flat plate having a predetermined thickness, extends in a direction in which the plug is inserted, and has a first width, and the second power supply terminal is provided on an end surface of the flat plate, extends in the direction in which the plug is inserted, and has a width greater than the first width.

21 Claims, 13 Drawing Sheets

(51) Int. Cl.
*H01R 24/60* (2011.01)
*G09G 5/00* (2006.01)
*H01R 107/00* (2006.01)

(52) U.S. Cl.
CPC ......... *G09G 2370/12* (2013.01); *H01R 24/60* (2013.01); *H01R 2107/00* (2013.01)

(58) Field of Classification Search
CPC ....... G06F 1/3289; G06F 1/266; H04L 12/12; H04L 12/10
See application file for complete search history.

(56) References Cited

U.S. PATENT DOCUMENTS

| 8,984,578 | B2* | 3/2015 | Nakajima | H04N 5/63 |
| | | | | 348/552 |
| 9,692,166 | B2* | 6/2017 | Kao | H01R 13/42 |
| 9,780,476 | B2* | 10/2017 | Guo | H01R 13/26 |
| 9,923,310 | B2* | 3/2018 | Kao | H01R 13/6596 |
| 2008/0203818 | A1* | 8/2008 | Kuo | G06F 1/263 |
| | | | | 307/64 |
| 2011/0122663 | A1* | 5/2011 | Huang | H02H 9/004 |
| | | | | 363/50 |
| 2012/0077384 | A1* | 3/2012 | Bar-Niv | H01R 27/00 |
| | | | | 439/625 |
| 2013/0059453 | A1* | 3/2013 | Tseng | H01R 27/00 |
| | | | | 439/78 |
| 2013/0162050 | A1* | 6/2013 | Chang | H01R 13/6683 |
| | | | | 307/86 |
| 2013/0178094 | A1* | 7/2013 | Huang | H01R 13/6597 |
| | | | | 439/490 |
| 2014/0206241 | A1* | 7/2014 | Chen | H01R 12/7088 |
| | | | | 439/676 |
| 2015/0044894 | A1* | 2/2015 | Chen | H01R 31/065 |
| | | | | 439/217 |

FOREIGN PATENT DOCUMENTS

| JP | 2011-205164 | A | 10/2011 |
| WO | 2008/071049 | A | 6/2008 |
| WO | 2008/071049 | A1 | 6/2008 |
| WO | 2009/011379 | A | 1/2009 |
| WO | 2009/011379 | A1 | 1/2009 |

* cited by examiner

FIG. 4

(a)

| PIN | Signal Assignment |
|---|---|
| 1 | TMDS Data#2+ |
| 2 | TMDS Data#2 Shield |
| 3 | TMDS Data#2− |
| 4 | TMDS Data#1+ |
| 5 | TMDS Data#1 Shield |
| 6 | TMDS Data#1− |
| 7 | TMDS Data#0+ |
| 8 | TMDS Data#0 Shield |
| 9 | TMDS Data#0− |
| 10 | TMDS Clock+ |
| 11 | TMDS Clock Shield |
| 12 | TMDS Clock− |
| 13 | CEC |
| 14 | Utility |
| 15 | SCL |
| 16 | SDA |
| 17 | DDC/CEC GND |
| 18 | +5V Power |
| 19 | Hot Plug Detect |
| 20 | VCC |
| 21 | GND |

(b)

| PIN | Signal Assignment |
|---|---|
| 1 | TMDS Data#2+ |
| 2 | TMDS Data#2 Shield |
| 3 | TMDS Data#2− |
| 4 | TMDS Data#1+ |
| 5 | TMDS Data#1 Shield |
| 6 | TMDS Data#1− |
| 7 | TMDS Data#0+ |
| 8 | TMDS Data#0 Shield |
| 9 | TMDS Data#0− |
| 10 | TMDS Clock+ |
| 11 | TMDS Clock Shield |
| 12 | TMDS Clock− |
| 13 | CEC |
| 14 | Utility |
| 15 | SCL |
| 16 | SDA |
| 17 | DDC/CEC GND |
| 18 | +5V Power |
| 19 | Hot Plug Detect |

ELECTRONIC APPARATUS, POWER SUPPLY RECEPTION METHOD IN ELECTRONIC APPARATUS, POWER SUPPLY METHOD IN ELECTRONIC APPARATUS, AND CABLE

CROSS REFERENCE TO RELATED APPLICATIONS

This application is a U.S. National Phase of International Patent Application No. PCT/JP2015/057768 filed on Mar. 16, 2015, which claims priority benefit of Japanese Patent Application No. JP 2014-055938 filed in the Japan Patent Office on Mar. 19, 2014. Each of the above-referenced applications is hereby incorporated herein by reference in its entirety.

TECHNICAL FIELD

The present technology relates to electronic apparatuses, power supply reception methods in electronic apparatuses, power supply methods in electronic apparatuses, and cables. In particular, the present technology relates to, for example, an electronic apparatus for transmitting contents to an external apparatus through a receptacle.

BACKGROUND ART

In recent years, High Definition Multimedia Interface (HDMI) has been widely used as a digital interface for connecting consumer electronic (CE) apparatuses, and has become the de facto industry standard. According to the current HDMI standard, power can be supplied from a source apparatus to a sink apparatus through a power supply line (see, for example, Patent Literature 1). The current HDMI standard specifies that the power supply (+5 V terminal) from a source apparatus to a sink apparatus is up to 5 V and 55 mA, assuming that the main purpose is to read an EDID ROM in a sink apparatus in the standby state through a DDC line.

CITATION LIST

Patent Literature

Patent Literature 1: JP 2011-205164A

SUMMARY OF INVENTION

Technical Problem

With the recent advent of a number of mobile apparatuses, such as a smartphone, a digital camera, and the like, which function as HDMI source apparatuses, there are type D connectors, defined in the HDMI standard, which have smaller outside dimensions and are thereby suitable for such mobile apparatuses. However, the power supply function has not been modified. Therefore, there is a demand for achieving power supply from a stationary apparatus to a mobile apparatus, which feature has been achieved in other standards.

Type D connectors have smaller outside dimensions, and therefore, their pin widths cannot allow for reception of a large current. Therefore, it is significantly difficult to receive power supply using a current connector. Note that HDMI is widely used as a digital interface, and therefore, it is essential to ensure compatibility with existing connectors.

It is an object of the present technology to extend an interface function.

Solution to Problem

A concept of the present technology is an electronic apparatus including: a receptacle configured to connect to a plug of a cable for connecting the electronic apparatus to an external apparatus. The receptacle includes a first power supply terminal, and a second power supply terminal having a greater current capacity than a current capacity of the first power supply terminal.

In the present technology, included is the receptacle configured to connect to a plug of a cable for connecting the electronic apparatus to an external apparatus. The receptacle includes the first power supply terminal and the second power supply terminal. In this case, the second power supply terminal has a greater current capacity than that of the first power supply terminal.

For example, in the receptacle, the first power supply terminal may be provided on a surface of a flat plate having a predetermined thickness, extend in a direction in which the plug is inserted, and have a first width, and the second power supply terminal may be provided on an end surface of the flat plate, extend in the direction in which the plug is inserted, and have a width greater than the first width. In this case, for example, the receptacle may further include a ground terminal provided on an end surface of the flat plate opposite from the end surface having the second power supply terminal, the ground terminal extending in the direction in which the plug is inserted and having a width greater than the first width. Thus, the second power supply terminal or the like is provided on the end surface of the flat plate. Therefore, the interface function of an existing receptacle having the first power supply terminal on the surface of the flat plate is maintained without modification.

Further, in this case, for example, the second power supply terminal may be formed so that at least a thickness in a direction perpendicular to the end surface becomes gradually thicker in the direction in which the plug is inserted. In this case, the plug can be smoothly inserted without providing play between the receptacle terminal and the plug terminal. In addition, a large contact area between the receptacle terminal and the plug terminal can be ensured.

Further, in this case, for example, the second power supply terminal may be formed to cover the end surface and a portion of two surfaces of the flat plate contiguous with the end surface. In this case, the second power supply terminal has a cross section with a generally U-shape. If the plug terminal has a shape suitable for that of the receptacle terminal, a larger contact area between the receptacle terminal and the plug terminal can be ensured.

For example, a power supply reception unit configured to receive power supplied from the external apparatus through the second power supply terminal of the receptacle may be further included. As a result, power can be received from the external apparatus through the second power supply terminal of the receptacle, and can be utilized. In this case, for example, a configuration/capability determination unit configured to determine whether or not the external apparatus has power supply configuration/capability; and a power supply request unit configured to, when the configuration/capability determination unit determines that the external apparatus has power supply configuration/capability, request the external apparatus to supply power may be further included. The power supply reception unit may receive power supplied from the external apparatus through the second power supply terminal of the receptacle in response to the power supply request from the power supply request unit.

For example, a power supply unit configured to supply power to the external apparatus through the second power supply terminal of the receptacle may be further included. As a result, power can be supplied to the external apparatus through the second power supply terminal of the receptacle. In this case, for example, a determination unit configured to, when there is a power supply request from the external apparatus, determine whether or not the electronic apparatus is capable of supplying power to the external apparatus may be further included. When the determination unit determines that the electronic apparatus is capable of supplying power to the external apparatus, the power supply unit may supply power to the external apparatus through the second power supply terminal of the receptacle. For example, the determination unit may determine whether or not the electronic apparatus is capable of supplying power to the external apparatus, on the basis of a value of a current flowing during power supply to the second power supply terminal of the receptacle.

For example, a transmission unit configured to transmit a content to the external apparatus through the receptacle may be further included. In this case, for example, the transmission unit may transmit the content to the external apparatus through the receptacle using a differential signal. For example, the transmission unit may be an HDMI transmission unit.

For example, a reception unit configured to receive a content from the external apparatus through the receptacle may be further included. In this case, for example, the reception unit may receive the content from the external apparatus through the receptacle using a differential signal. For example, the reception unit may be an HDMI reception unit.

Thus, in the present technology, the receptacle includes, in addition to the first power supply terminal, the second power supply terminal having a greater current capacity than that of the first power supply terminal. Therefore, the receptacle can receive or supply greater current power supply from or to an external apparatus, resulting in an extension in the interface function.

Another concept of the present technology is a cable including: a signal line configured to transmit a content; a first power supply line; and a second power supply line having a greater current capacity than a current capacity of the first power supply line.

In the present technology, in addition to the first power supply line, included is the second power supply line having a greater current capacity than that of the first power supply line. Therefore, greater current power supply can be received or supplied from or to an external apparatus using the cable of the present technology.

Another concept of the present technology is an electronic apparatus including: a receptacle configured to connect to a plug of a cable for connecting the electronic apparatus to an external apparatus. The receptacle includes a predetermined number of first signal terminals provided on a surface of a flat plate and extending in a direction in which the plug is inserted, and a second signal terminal provided on one or both of end surfaces of the flat plate and extending in the direction in which the plug is inserted.

In the present technology, included is the receptacle configured to connect to a plug of a cable for connecting the electronic apparatus to an external apparatus. The receptacle includes the predetermined number of first signal terminals provided on a surface of a flat plate and extending in a direction in which the plug is inserted, and the second signal terminal provided on one or both of end surfaces of the flat plate and extending in the direction in which the plug is inserted. Therefore, the interface function of an existing receptacle having the first power supply terminal on the surface of the flat plate is maintained without modification, and at the same time, the interface function can be extended.

Advantageous Effects of Invention

According to the present technology, the interface function can be extended. Note that the advantageous effects described herein are merely illustrative and not restrictive, and additional advantageous effects may be achieved.

BRIEF DESCRIPTION OF DRAWINGS

FIG. 4 is a diagram showing comparison of a current HDMI pin assignment and a new HDMI pin assignment.

DESCRIPTION OF EMBODIMENT(S)

Modes for carrying out the present invention (hereinafter referred to as "embodiments") will now be described. Note that description will be provided in the following order.
1. Embodiments
2. Variations 1. Embodiments

Figure 1:
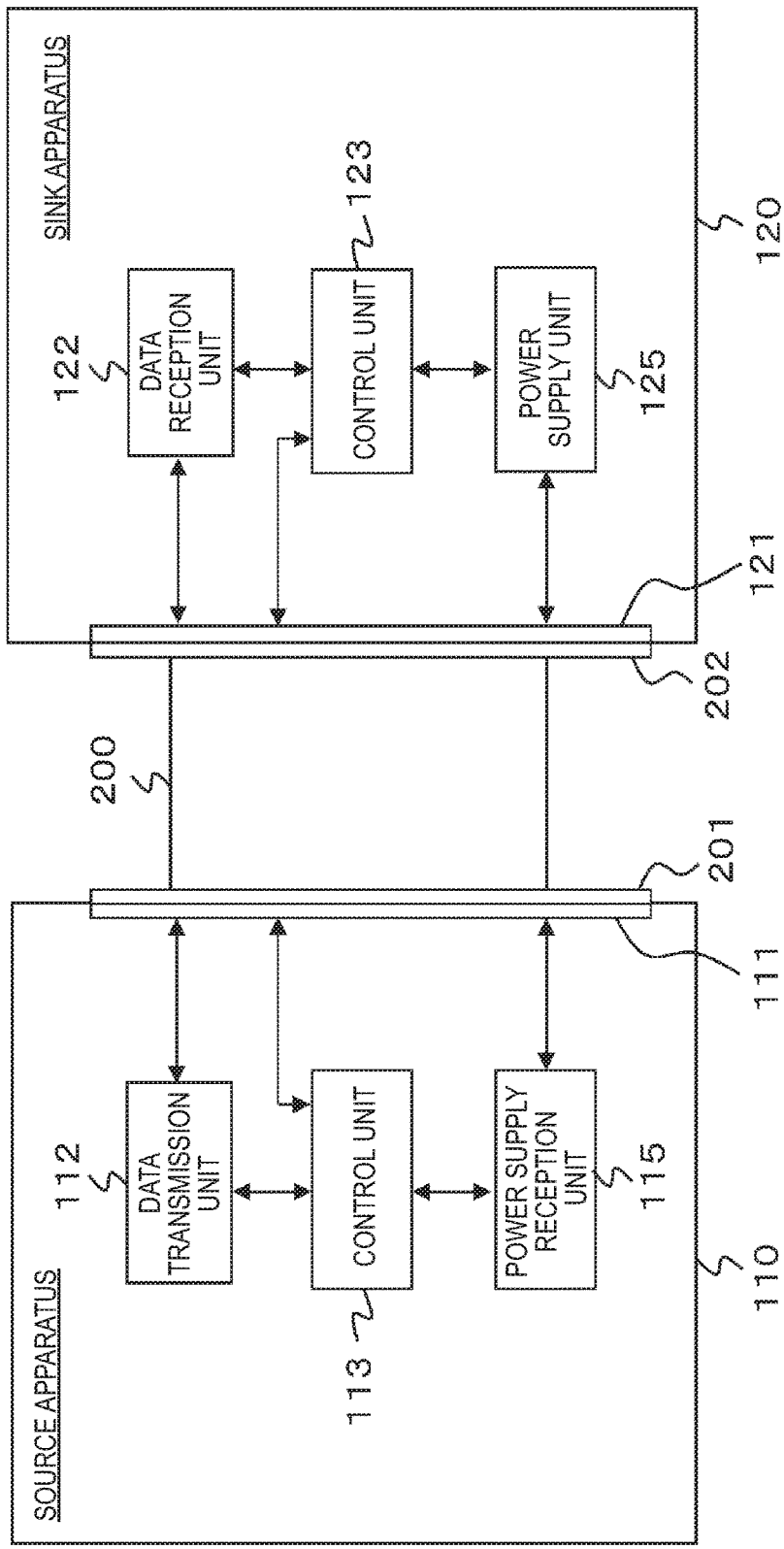
FIG. 1 is a block diagram showing a configuration example of an AV system according to an embodiment.

[Configuration Example of AV System]
FIG. 1 shows a configuration example of an audio and visual (AV) system 100 according to an embodiment. The AV system 100 includes a source apparatus 110 and a sink apparatus 120 which are connected together. The source apparatus 110 is an AV source, such as a game machine, disc player, set-top box, digital camera, mobile telephone, or the like. The sink apparatus 120 is, for example, a television set, projector, or the like. The source apparatus 110 and the sink apparatus 120 are connected together by a cable 200.

The source apparatus 110 is provided with a receptacle 111 which is a connector. A data transmission unit (HDMI transmission unit) 112 and a power supply reception unit 115 are connected to the receptacle 111. The sink apparatus 120 is provided with a receptacle 121 which is a connector. A data reception unit (HDMI reception unit) 122 and a power supply unit 125 are connected to the receptacle 121.

Also, the cable 200 is provided with a plug 201 which is a connector at one end thereof, and a plug 202 which is a connector the other end thereof. The plug 201 at one end of the cable 200 is connected to the receptacle 111 of the source apparatus 110, while the plug 202 at the other end of the cable 200 is connected to the receptacle 121 of the sink apparatus 120.

The source apparatus 110 has a control unit 113. The control unit 113 controls the entire source apparatus 110. The control unit 113 acquires profile data from the sink apparatus 120 through a line such as CEC, DDC, or the like, and determines whether the sink apparatus 120 has power supply configuration/capability, on the basis of the profile data. Thereafter, the control unit 113, when determining that the sink apparatus 120 has power supply configuration/capability, requests the sink apparatus 120 through a line such as CEC, DDC, or the like to supply power. The power supply reception unit 115 receives power supplied from the sink apparatus 120 through the receptacle 111.

The sink apparatus 120 has a control unit 123. The control unit 123 controls the entire sink apparatus 120. The control unit 123, when receiving a power supply request from the source apparatus 110, determines whether power can be supplied to the source apparatus 110. When the control unit 123 determines that power can be supplied, the power supply unit 125 supplies power to the source apparatus 110 through the receptacle 121.

[Configuration Examples of Data Transmission Unit and Data Reception Unit]

Figure 2:
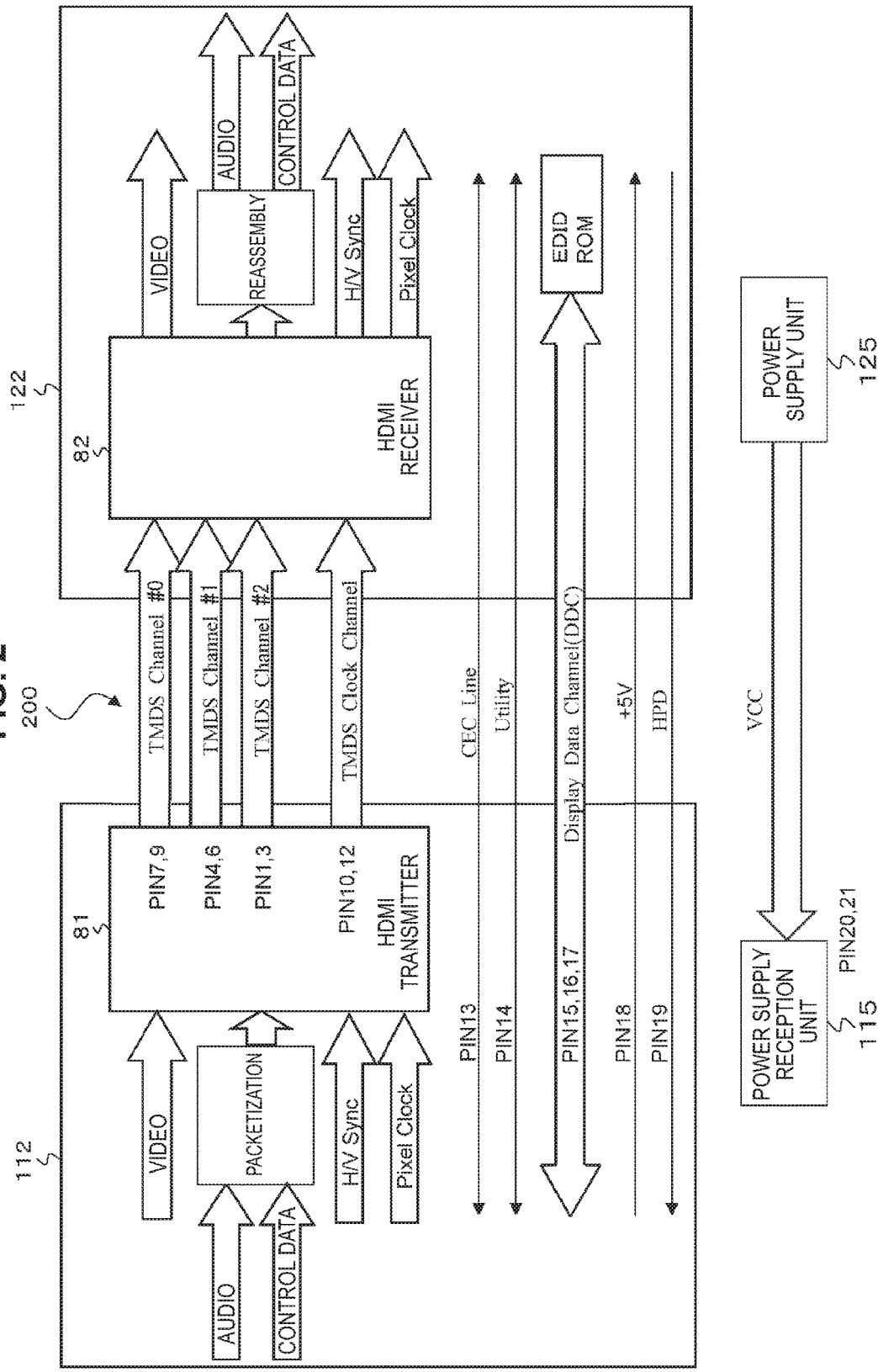
FIG. 2 is a diagram showing configuration examples of data transmission unit and a power reception unit of a source apparatus, and a data reception unit and a power supply unit of a sink apparatus.

FIG. 2 shows configuration examples of the data transmission unit 112 of the source apparatus 110 and the data reception unit 122 of the sink apparatus 120 in the AV system 100 of FIG. 1. The data transmission unit 112 unidirectionally transmits a differential signal corresponding to uncompressed video data for each screen to the data reception unit 122 through a plurality of channels, during an effective image period (also referred to as an "active video period").

Here, the effective image period is a period obtained by removing a horizontal blanking interval and a vertical blanking interval from the period between a vertical synchronization signal and the next vertical synchronization signal. Also, the data transmission unit 112 unidirectionally transmits differential signals corresponding to at least audio data, control data, other auxiliary data and the like accompanying video data, to the data reception unit 122 through a plurality of channels, in a horizontal blanking interval or a vertical blanking interval.

The data reception unit 122 receives a differential signal corresponding to video data unidirectionally transmitted from the data transmission unit 112 through a plurality of channels during an active video period. Also, the data reception unit 122 receives differential signals corresponding to audio data and control data unidirectionally transmitted from the data transmission unit 112 through a plurality of channels during a horizontal blanking interval or a vertical blanking interval.

There are the following transmission channels in the HDMI system including the data transmission unit 112 and the data reception unit 122. Among the transmission channels are differential signal channels (a TMDS channel, a TMDS clock channel).

Specifically, there are three TMDS channels #0 to #2 which are transmission channels for unidirectionally and serially transmitting video data and audio data from the data transmission unit 112 to the data reception unit 122 in synchronization with a pixel clock. Also, there is a TMDS clock channel which is a transmission channel for transmitting a TMDS clock.

For example, an HDMI transmitter 81 of the data transmission unit 112 converts uncompressed video data into a corresponding differential signal, and unidirectionally and serially transmits the differential signal to the data reception unit 122 connected thereto by the cable 200, through the three TMDS channels #0, #1, and #2. Also, the HDMI transmitter 81 converts audio data, necessary control data, other auxiliary data, and the like accompanying the uncompressed video data into corresponding differential signals, and unidirectionally and serially transmits the differential signals to the data reception unit 122 through the three TMDS channels #0, #1, and #2.

Moreover, the HDMI transmitter 81 transmits a TMDS clock which is synchronous with video data to be transmitted through the three TMDS channels #0, #1, and #2, to the data transmission unit 122 through the TMDS clock channel. Here, 10-bit video data is transmitted through a TMDS channel #i (i=0, 1, or 2) during a clock of the TMDS clock.

An HDMI receiver 82 of the data reception unit 122 receives a differential signal corresponding to video data, and differential signals corresponding to audio data and control data, which are unidirectionally transmitted from the data transmission unit 112, through the TMDS channels #0, #1, and #2. In this case, the HDMI receiver 82 receives the signals in synchronization with a pixel clock (TMDS clock) which is transmitted from the data transmission unit 112 through the TMDS clock channel.

The transmission channels of the HDMI system include, in addition to the above TMDS channels and TMDS clock channel, transmission channels called a display data channel (DDC) and a CEC line. The DDC includes two signal lines included in the cable 200. The DDC is used by the data transmission unit 112 to read enhanced extended display identification data (E-EDID) from the data reception unit 122.

Specifically, the data reception unit 122 has, in addition to the HDMI receiver 82, an EDID ROM (EEPROM) which stores E-EDID which is configuration/capability information about the configuration/capability thereof. For example, the data transmission unit 112 reads E-EDID from the data reception unit 122 connected thereto by the cable 200, through the DDC, in response to a request from the control unit 113.

The data transmission unit 112 transfers the read E-EDID to the control unit 113. The control unit 113 stores the E-EDID to a flash ROM or a DRAM (not shown). The control unit 113 can recognize settings for the configuration/capability of the data reception unit 122 on the basis of the E-EDID. The CEC line, which includes a signal line included in the cable 200, is used for bidirectional communication of control data between the data transmission unit 112 and the data reception unit 122.

Also, the cable 200 includes a line (HPD line) connected to a pin called "hot plug detect (HPD)." A source apparatus can detect connection to a sink apparatus using the HPD line. Also, the cable 200 includes a first power supply line (+5 V power line) for supplying power from a source apparatus to a sink apparatus. The cable 200 also includes a utility line.

Also, the cable 200 includes a second power supply line (VCC line) which is used for supplying power from the sink apparatus 120 to the source apparatus 110. The second power supply line has a greater current capacity than that of the above first power supply line.

Figure 3:
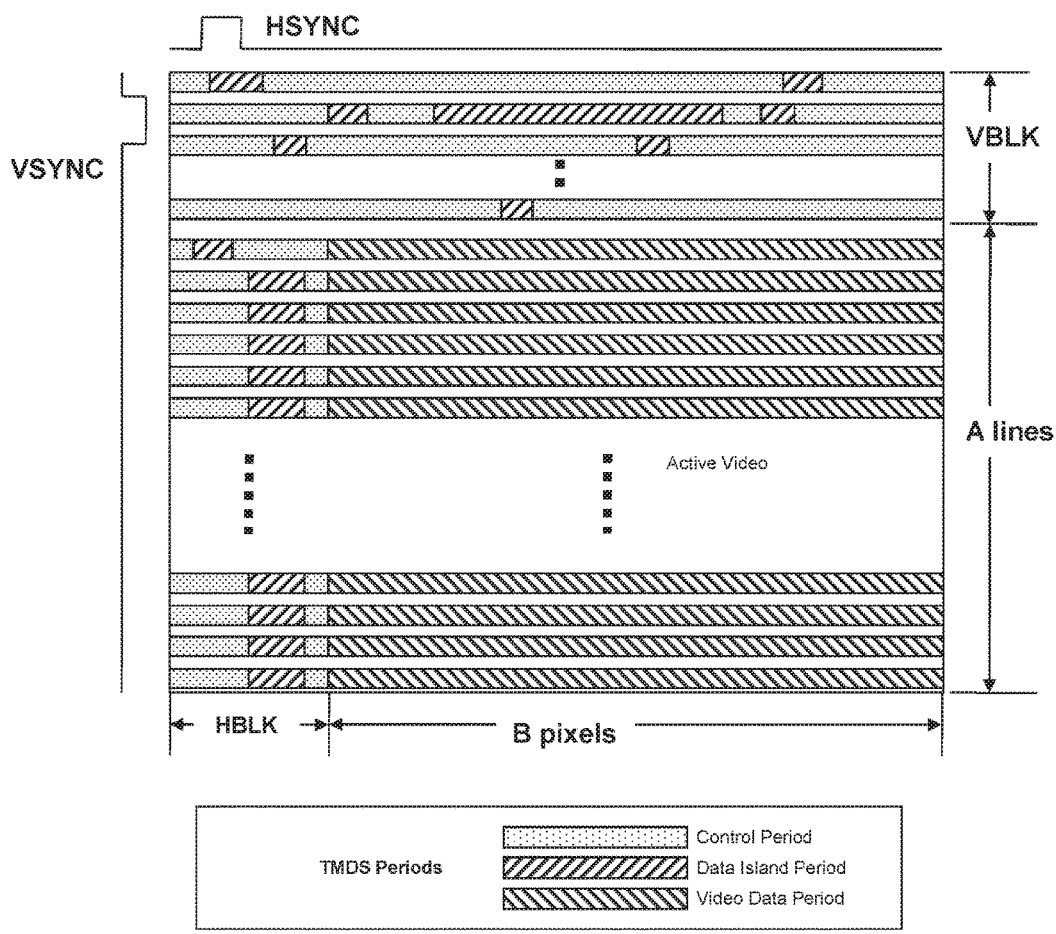
FIG. 3 is a diagram showing a structure example of TMDS transmission data.

FIG. 3 shows a structure example of TMDS transmission data. FIG. 3 shows various transmission data periods in a case where image data of B pixels (width)×A lines (length) is transmitted through the TMDS channels #0 to #2. A video field in which transmission data is transmitted through the HDMI TMDS channels has three periods corresponding to the types of transmission data. The three periods are a video data period, a data island period, and a control period.

Here, the video field period is a period from the active edge of a vertical synchronization signal to the active edge of the next vertical synchronization signal. The video field period is divided into a horizontal blanking interval, a vertical blanking interval, and an active video period. The active video period is a period obtained by removing the horizontal blanking interval and the vertical blanking interval from the video field period. The video data period is assigned to the active video period. During the video data period, the data of active pixels of B pixels×A lines constituting uncompressed image data corresponding to one screen, is transmitted.

The data island period and the control period are assigned to the horizontal blanking interval and the vertical blanking interval. During the data island period and the control period, auxiliary data is transmitted. In other words, the data island period is assigned to a portion of the horizontal blanking interval and the vertical blanking interval. During the data island period, audio data packets, control packets, and the like of the auxiliary data are transmitted. The control period is assigned to the other portion of the horizontal blanking interval and the vertical blanking interval. During the control period, a vertical synchronization signal, a horizontal synchronization signal, and the like are transmitted.

FIG. 4(a) shows pin assignments (hereinafter referred to as "new HDMI pin assignments") of the receptacle 111 of the source apparatus 110 and the receptacle 121 of the sink apparatus 120.

TMDS data #i+ and TMDS data #i− which are differential signals of a TMDS channel #i (i=0, 1, and 2) are transmitted through two lines which are differential lines. Pins (pins of pin No. 7, 4, and 1) are assigned the TMDS data #i+, and pins (pins of pin No. 9, 6, and 3) are assigned the TMDS data #i−.

A TMDS clock+ and a TMDS clock− which are differential signals in the TMDS clock channel are transmitted through two lines which are differential lines. A pin of pin No. 10 is assigned the TMDS clock+, and a pin of pin No. 12 is assigned the TMDS clock−.

Also, a CEC signal which is a control data is transmitted through the CEC line. A pin of pin No. 13 is assigned the CEC signal. Also, a serial data (SDA) signal which is used to read E-EDID or the like is transmitted through the SDA line. A pin of pin No. 16 is assigned the SDA signal. Also, a serial clock (SCL) signal which is a clock signal which is used to transmit and receive the SDA signal, is transmitted through the SCL line. A pin of pin No. 15 is assigned the SCL. Note that the above DDC line includes the SDA line and the SCL line.

Also, a pin of pin No. 19 is assigned hot plug detect (HPD). Also, a pin of pin No. 14 is assigned utility. Also, a pin of pin No. 17 is assigned DDC/CEC GND. Also, a pin of pin No. 18 is assigned a first power supply terminal (+5 V power). Also, a pin of pin No. 20 is assigned a second power supply terminal (VCC) having a greater current capacity than that of the above first power supply. Also, a pin of pin No. 21 is assigned a ground return terminal (GND).

FIG. 4(b) shows a current HDMI pin assignment for comparison with the above new HDMI pin assignment. The pin assignment of pins of pin No. of 1 to 19 in the new HDMI pin assignment are exactly the same as the current HDMI pin assignment. In other words, the new HDMI pin assignment is fully compatible with the current HDMI pin assignment.

Figure 5:
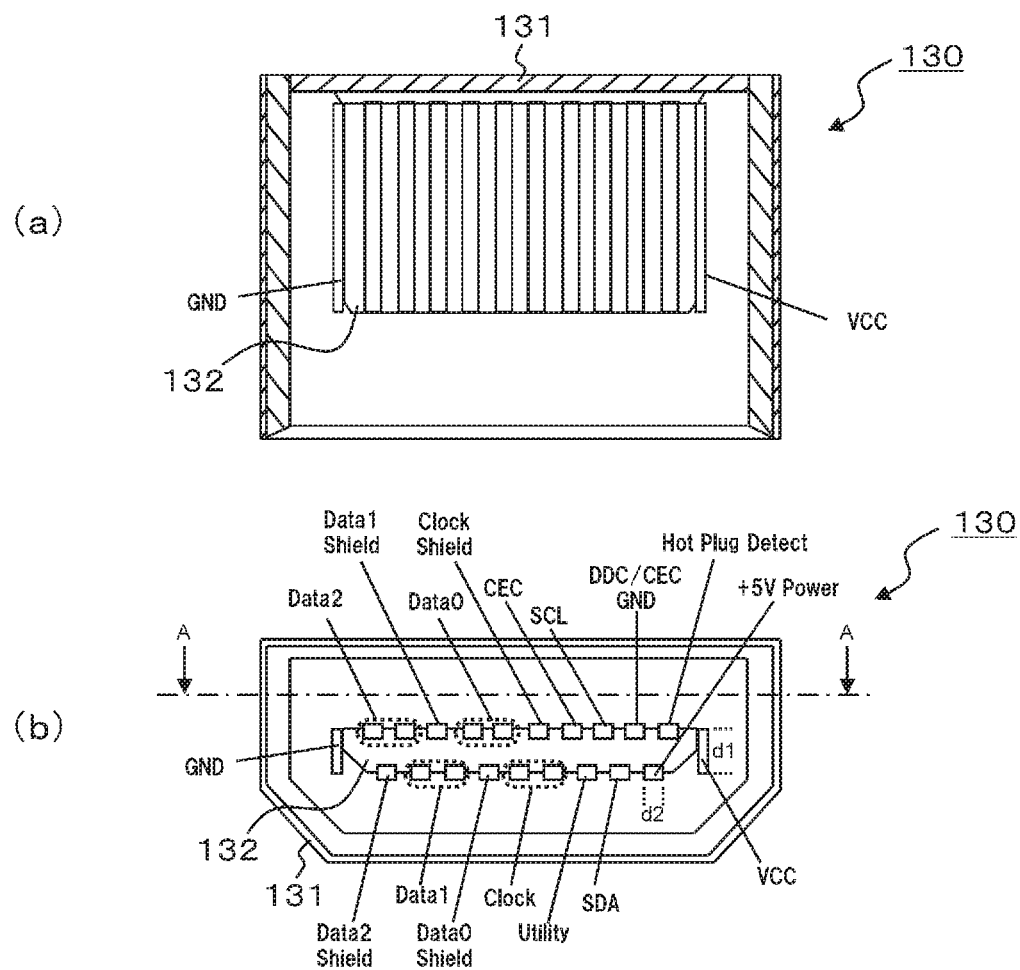
FIG. 5 is a diagram schematically showing a configuration example of a receptacle suitable for a type D connector.

FIG. 5 schematically shows a configuration example of a receptacle 130 (111, 121) suitable for a type D connector. FIG. 5(b) is a front view, and FIG. 5(a) is a top view taken along line A-A of FIG. 5(b). In the receptacle 130, a flat plate 132 having a surface parallel to the direction in which a plug is inserted is provided in an outer housing 131. Terminals (pins) are provided on the surface of the flat plate 132, extending in the plug insertion direction. Also, a power supply terminal (VCC) and a ground return terminal (GND) are provided on end surfaces of the flat plate 132, extending in the plug insertion direction.

The power supply terminal (VCC) and the ground return terminal (GND) have a greater current capacity than that of the terminals provided on the surface of the flat plate 132. Specifically, the power supply terminal (VCC) and the ground return terminal (GND) has a width d1 greater than a width d2 of the terminals provided on the surface of the flat plate 132. For example, d1=0.6 mm and d2=0.2 mm.

Figure 6:
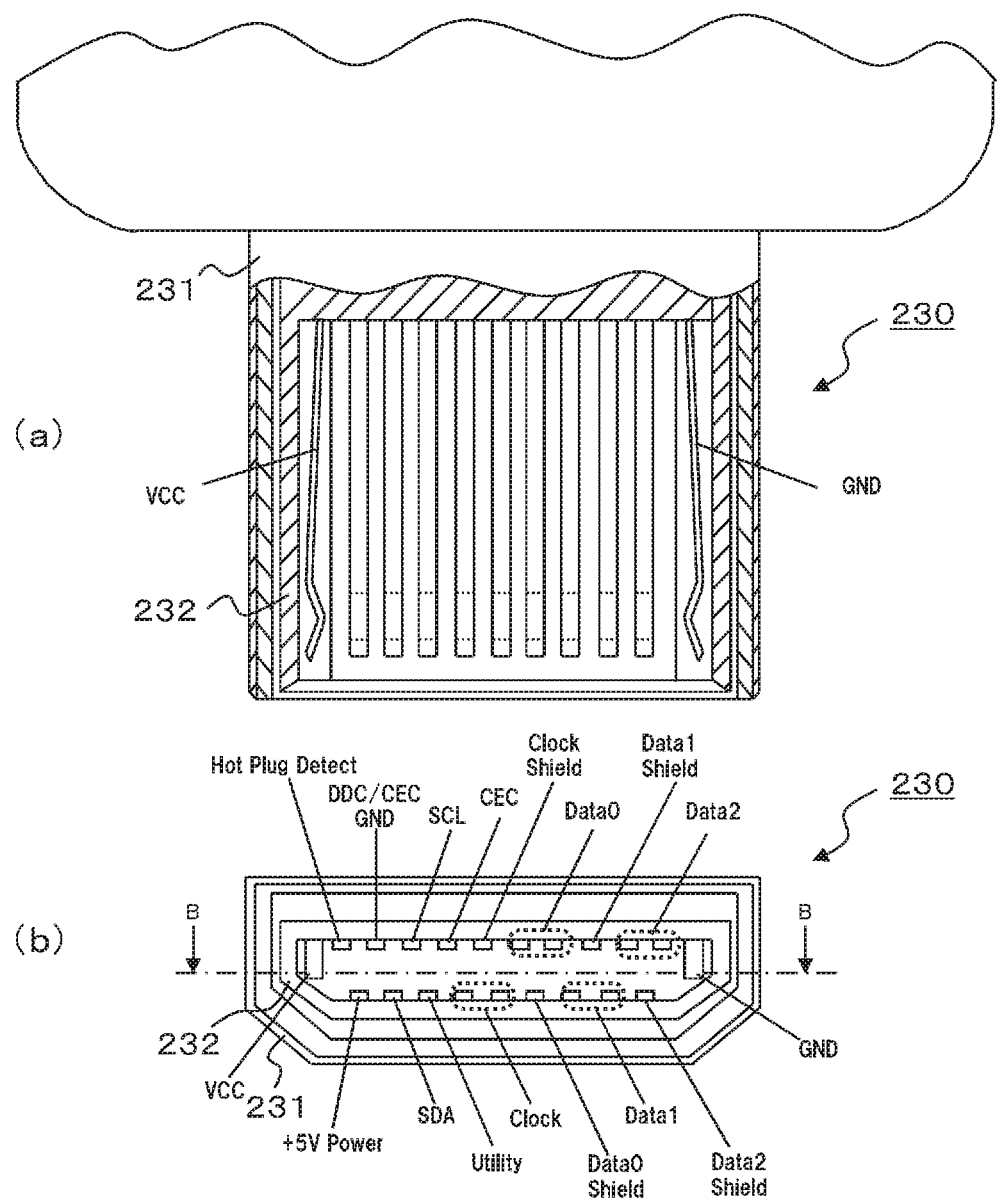
FIG. 6 is a diagram schematically showing a configuration example of a plug suitable for a type D connector.

FIG. 6 schematically shows a configuration example of a plug 230 (201, 202) suitable for a type D connector. FIG. 6(b) is a front view, and FIG. 6(a) is a top view partially taken along line B-B of FIG. 6(b). The plug 230 is suitable for the receptacle 130 shown in FIG. 5. In the plug 230, a pipe-shaped member 232 which is to cover a flat plate 132 of the receptacle 130 is provided in an outer housing 231.

In the pipe-shaped member 232, terminals (pins) corresponding to the terminals (pins) provided on the surface of the flat plate 132 of the receptacle 130, are provided, extending in the same direction. Also, in the pipe-shaped member 232, a power supply terminal (VCC) and a ground return terminal (GND) corresponding to the above power supply terminal (VCC) and ground return terminal (GND) provided on the end surfaces of the flat plate 132 of the receptacle 130, are provided, extending in the same direction. The terminals (pins) of the plug 230 include a spring member so that, when the plug 230 is attached to the receptacle 130, the terminals (pins) of the plug 230 are brought into contact with and pressed against the respective corresponding terminals (pins) of the receptacle 130.

Figure 7:
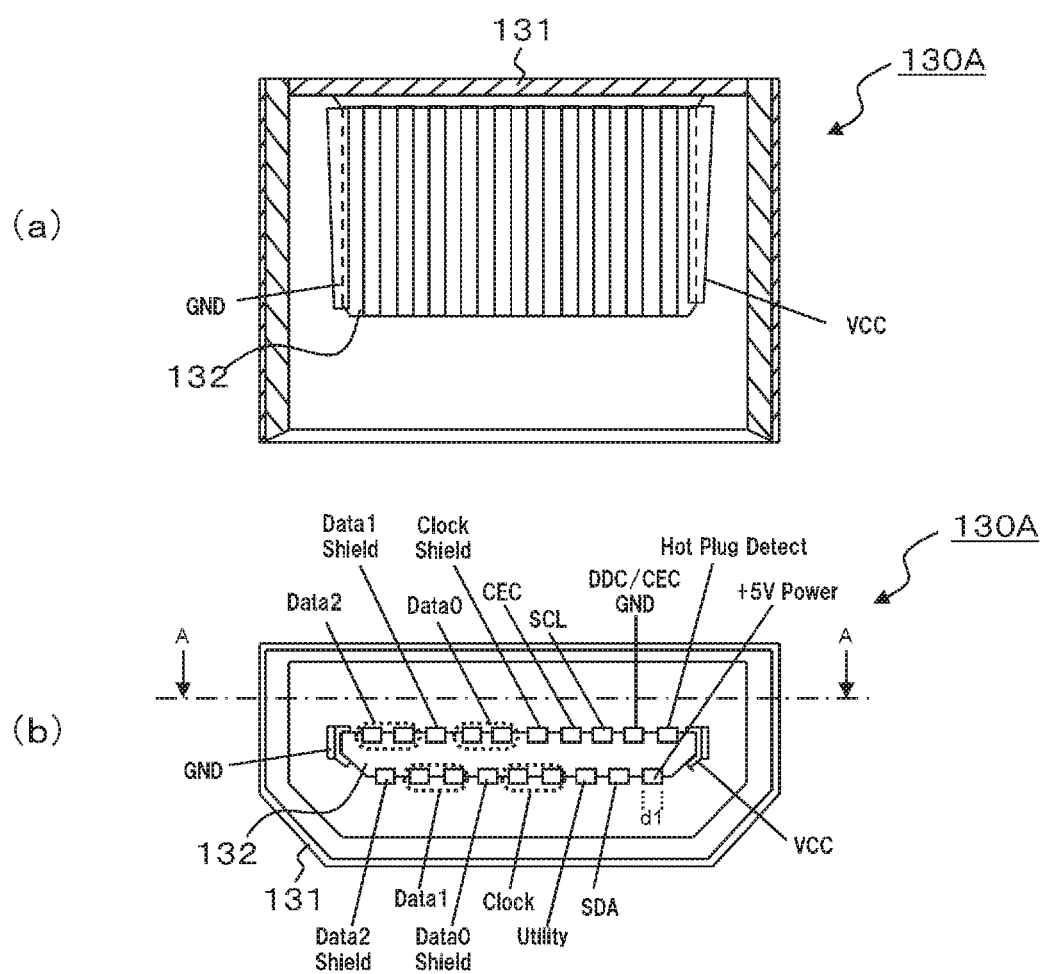
FIG. 7 is a diagram schematically showing another configuration example of a receptacle suitable for a type D connector.

FIG. 7 schematically shows another configuration example of a receptacle 130A (111, 121) suitable for a type D connector. FIG. 7(b) is a front view, and FIG. 7(a) is a top view taken along line A-A of FIG. 7(b). The receptacle 130A has the same configuration as that of the receptacle 130 shown in FIG. 5, except that the power supply terminal (VCC) and the ground return terminal (GND) which are provided on end surfaces of the flat plate 132, extending in the plug insertion direction, have different shapes.

The power supply terminal (VCC) and the ground return terminal (GND) are formed so that a thickness thereof in a direction perpendicular to the end surface of the flat plate 132 becomes gradually thicker in the plug insertion direction. In other words, a surface of each of the power supply terminal (VCC) and the ground return terminal (GND) opposite from the end surface of the flat plate 132 is inclined with respect to the plug insertion direction. Such an inclined surface allows the plug to be smoothly inserted without providing play between the receptacle terminal and the plug terminal. In addition, a large contact area between the receptacle terminal and the plug terminal can be ensured.

Also, the power supply terminal (VCC) and the ground return terminal (GND) are each formed to cover the corresponding end surface of the flat plate 132 and a portion of the two surfaces of the flat plate which are contiguous with that end surface. Specifically, the power supply terminal (VCC) and the ground return terminal (GND) have a cross section with a generally U-shape. When such a U-shape is provided, then if the plug terminal has a shape suitable for that of the receptacle terminal, a larger contact area between the receptacle terminal and the plug terminal can be ensured.

Figure 8:
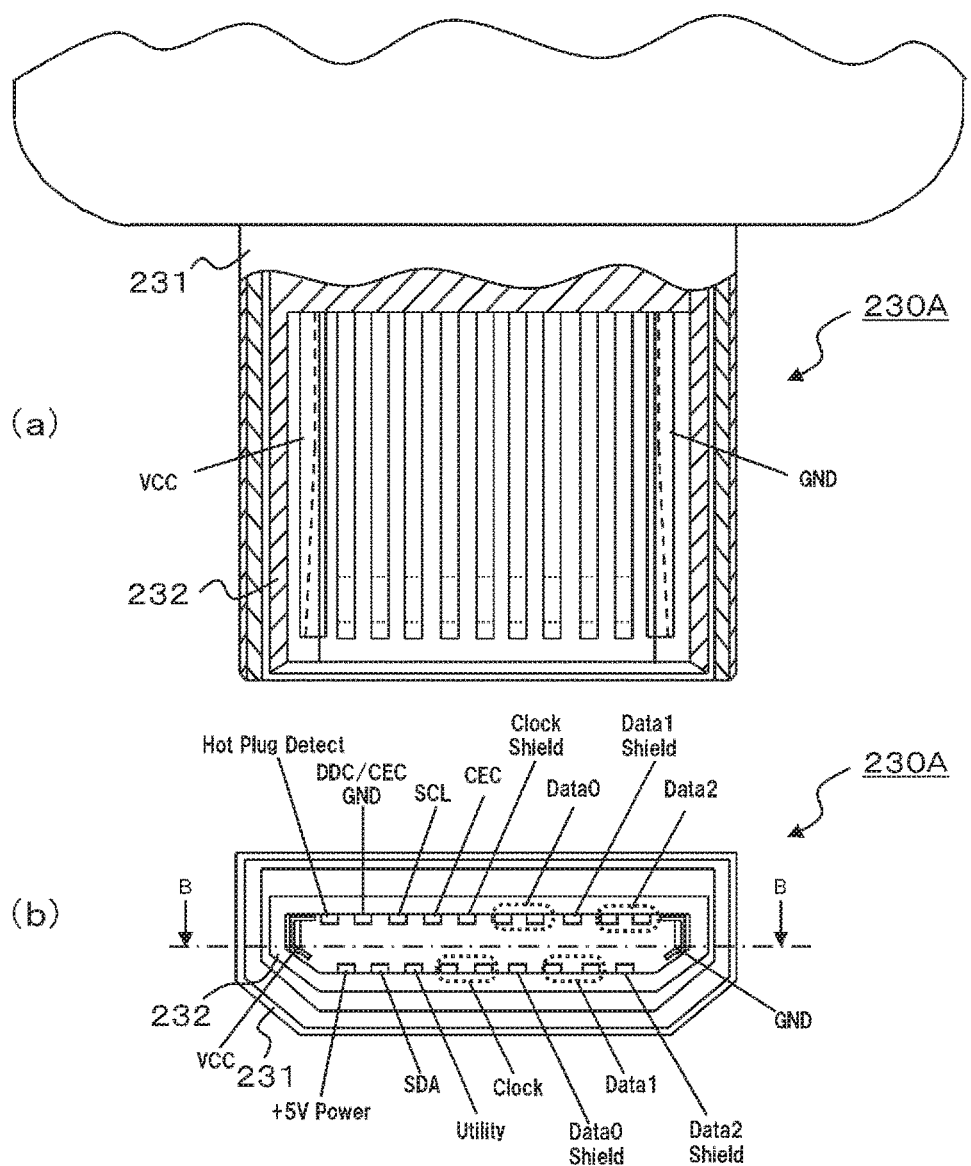
FIG. 8 is a diagram schematically showing another configuration example of a plug suitable for a type D connector.

FIG. 8 schematically shows a configuration example of a plug 230A (201, 202) suitable for a type D connector. FIG. 8(*b*) is a front view, and FIG. 8(*a*) is a top view partially taken along line B-B of FIG. 8(*b*). The plug 230A is suitable for the receptacle 130A shown in FIG. 7. The plug 230A has the same configuration as that of the plug 230 shown in FIG. 6, except that the power supply terminal (VCC) and the ground return terminal (GND) provided in the pipe-shaped member 232 have different shapes.

A surface of each of the power supply terminal (VCC) and the ground return terminal (GND) facing a surface perpendicular to the end surface of the corresponding one of the power supply terminal (VCC) and the ground return terminal (GND) of the flat plate 132 of the receptacle 130A, is inclined as shown by a dashed line. Such an inclined surface allows the plug to be smoothly inserted without providing play between the receptacle terminal and the plug terminal. In addition, a large contact area between the receptacle terminal and the plug terminal can be ensured.

Also, the power supply terminal (VCC) and the ground return terminal (GND) have a cross section with a generally U-shape so as to cover the power supply terminal (VCC) and the ground return terminal (GND) of the receptacle 130A. Such a U-shape can ensure a larger contact area between the receptacle terminal and the plug terminal.

Figure 9:
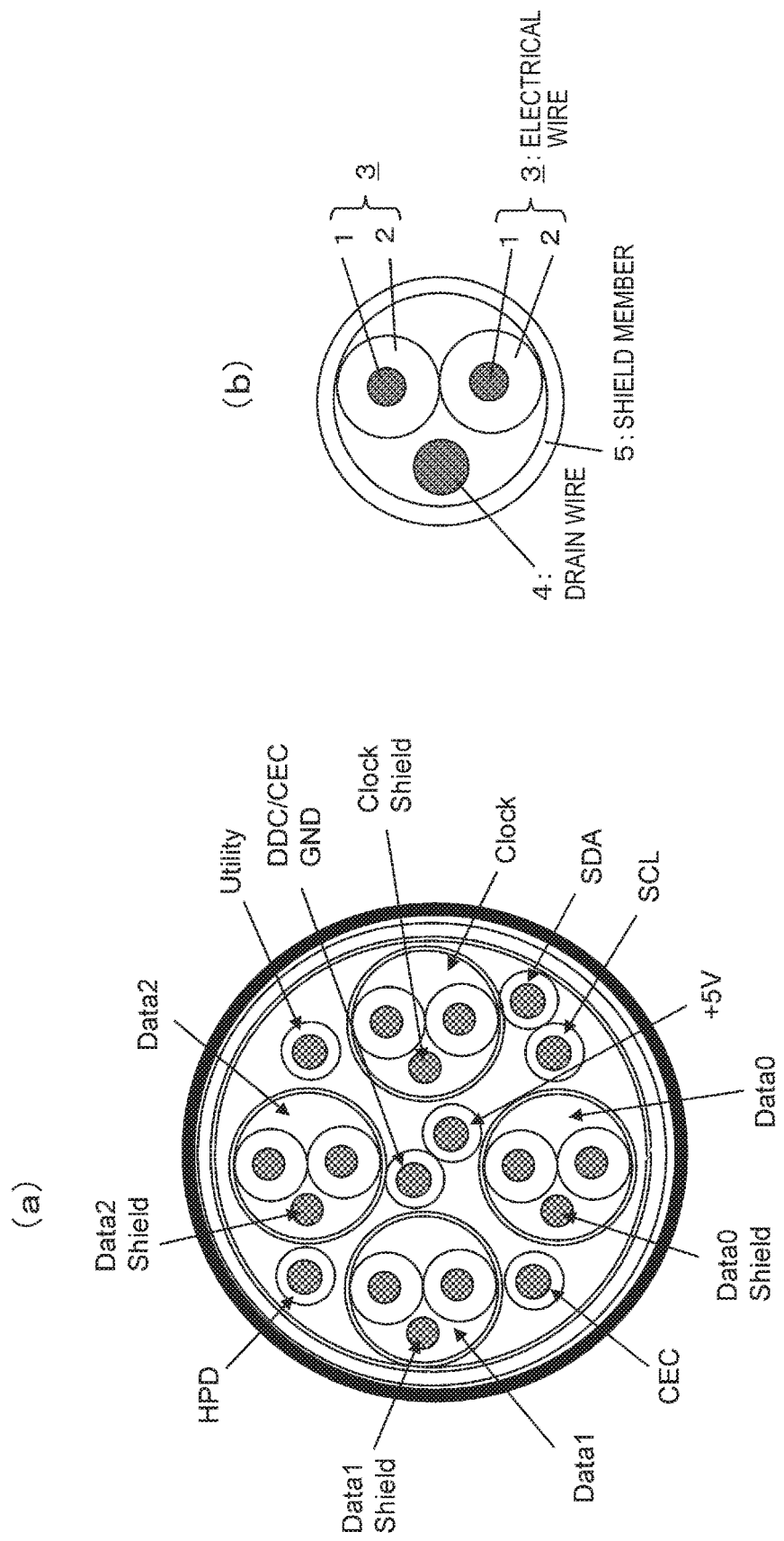
FIG. 9 is a diagram showing a structure example of a current HDMI cable.

FIG. 9(*a*) shows a structure example of a current HDMI cable. In the current HDMI cable, three data line pairs are configured as shielded twisted pair units (differential transmission lines) in order to achieve respective characteristics. Also, a clock line pair is also configured as a shielded twisted pair unit. FIG. 9(*b*) shows a structure example of a shielded twisted pair unit. The shielded twisted pair unit has a structure in which two electrical wires 3 and a drain wire 4 are covered by a shield member 5. Note that the electrical wire 3 is configured so that a core wire 1 is covered by a covering portion 2.

In the current HDMI cable, the drain wire included in each of the shielded twisted pair units for data and clock is connected to a plug pin attached to an end of the cable. In this case, each drain wire is connected to a pin (terminal) corresponding to each shield terminal (shield pin of pin No. 2, 5, 8, or 11) of the above receptacle (the current HDMI pin arrangement). These shield terminals are, for example, grounded at the source apparatus 110 and the sink apparatus 120. As a result, the drain wire included in each of the shielded twisted pair units for data and clock is grounded when the plug is connected to the receptacle (the current HDMI pin arrangement).

Figure 10:
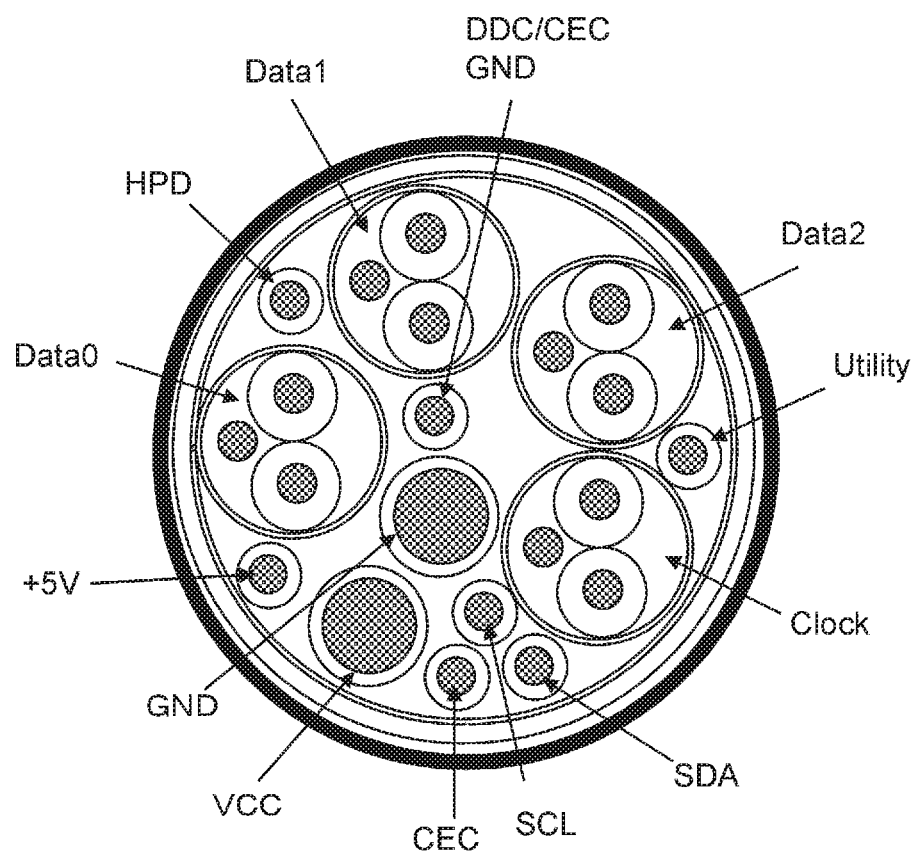
FIG. 10 is a diagram showing a structure example of a new HDMI cable.

FIG. 10 shows a structure example of a new HDMI cable which is used as the cable 200. In the new HDMI cable, three data line pairs and a clock line pair are configured as shielded twisted pair units (differential transmission lines) in order to achieve respective characteristics, as in the current HDMI cable. The new HDMI cable additionally includes two lines, i.e., the power supply line (VCC) and the ground return line (GND), in addition to the same lines that are included in the current HDMI cable. The two lines have a greater diameter than that of the existing power supply line (+5 V). Therefore, these lines have a greater current capacity than that of the existing power supply line (+5 V).

In conventional receptacles, a portion thereof corresponding to a region where the power supply terminal (VCC) and the ground return terminal (GND) of the receptacle 111, 121 of the present technology are provided, is formed of a dielectric material (plastics, ceramics, etc.). Therefore, when the plug 201, 202 of the present technology is inserted into a conventional receptacle, the power supply terminal (VCC) and the ground return terminal (GND) in the plug are insulated. Conversely, when a conventional plug is inserted into the receptacle 111, 121 of the present technology, the power supply terminal (VCC) and the ground return terminal (GND) in the receptacle 111, 121 are insulated.

Figure 11:
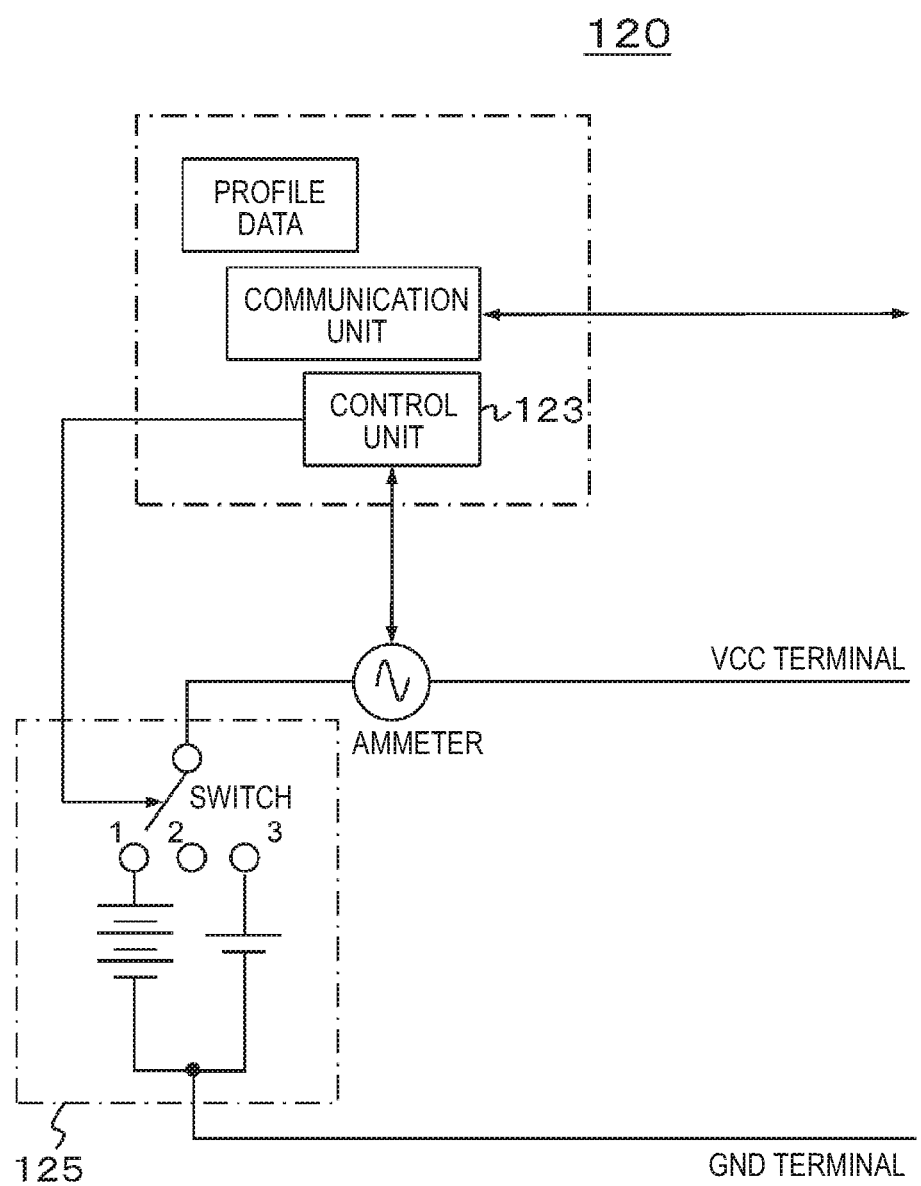
FIG. 11 is a diagram for describing a process performed until power is supplied.

As described above, the control unit 123 of the sink apparatus 120, when receiving a power supply request from the source apparatus 110, determines whether power can be supplied to the source apparatus 110, and supplies power to the source apparatus 110 if the determination result is positive. A process until power is supplied will be described with reference to FIG. 11.

The source apparatus 110 and the sink apparatus 120 have profile data indicating their own power profiles (indicating whether it can supply power, how many watts of power it can supply if possible, etc.). One of the source apparatus 110 and the sink apparatus 120 can know the configuration/capability of the other, for example, by referring to it using a communication function such as CEC, DDC, or the like.

Initially, the source apparatus 110 which demands power supply requests the sink apparatus 120 which can supply power, to supply power. The sink apparatus 120 which has power supply configuration/capability, when receiving a power supply request from the source apparatus 110, switches a switch shown in FIG. 11 from "2" in which the switch is off to mode "3" in which smaller power is supplied. Here, a current flowing through the system is measured using an ammeter.

When a predetermined value of current is measured by measurement using an ammeter, it is considered that a cable between the apparatuses is the cable 200 applicable to the present technology (conductive between VCC and GND). Conversely, when the current value is zero, it is considered that the cable is insulated in the system (i.e., the cable is broken), and the cable is not applicable to the present technology.

The control unit 123, when determining that the cable is not applicable to the present technology, notifies the source apparatus 110 requesting power supply that the cable is not applicable, and this function is not active and ends. Also, the control unit 123, when determining that the cable is applicable to power supply, switches the switch shown in FIG. 11 to "1" in which power can be normally supplied, and starts supplying power.

The control unit 123, when observing that a large current flows during power supply to such an extent that the ammeter exceeds a predetermined value (e.g., about 5 A), may immediately stop power supply, i.e., switch the switch to "2" in which the switch is off, and notify the source apparatus 110 that power supply is stopped, because a short circuit is likely to occur due to a defect somewhere in the system. Alternatively, when the cable is disconnected during power supply, or when the ammeter indicates zero, it is no longer necessary to supply power, and the switch may be switched to "2" in which the switch is off so that power supply is stopped.

Figure 12:
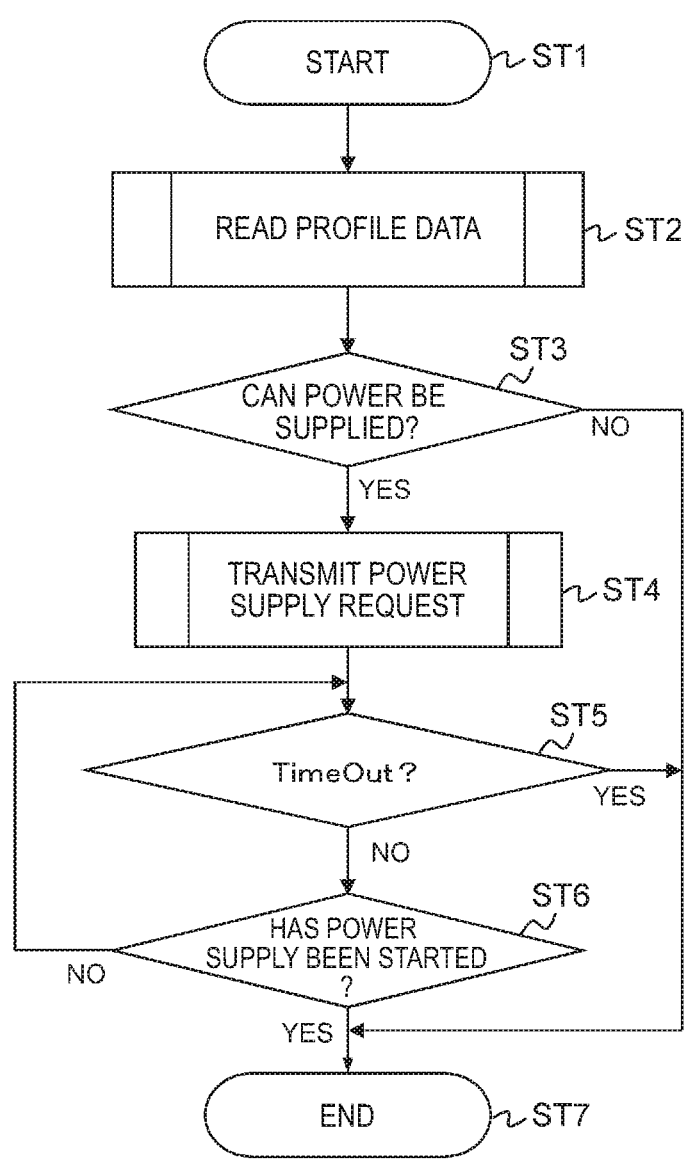
FIG. 12 is a flowchart showing an example of a process procedure performed by a control unit of a source apparatus until power supply is received.

A flowchart of FIG. 12 shows an example of a process procedure performed by the control unit 113 of the source apparatus 110 until power supply is received. In step ST1, the control unit 113 starts the process. Thereafter, in step ST2, the control unit 113 reads profile data of the sink apparatus 120.

Next, the control unit 113 determines whether or not the sink apparatus 120 can supply power. If the sink apparatus 120 can supply power, the control unit 113 transmits a power supply request to the sink apparatus 120 in step ST4. Next, in step ST5, the control unit 113 determines whether or not a predetermined time has passed since the request, i.e., whether or not timeout has occurred.

If timeout has not occurred, the control unit 113 determines whether or not the sink apparatus 120 has started supplying power, in step ST6. The control unit 113 can perform this determination on the basis of a value observed using the ammeter. When power supply has been started, the control unit 113 ends the process in step ST7. Meanwhile, when power supply has not been started, the control unit 113 returns to step ST5 and repeats an operation similar to that described above.

When the sink apparatus 120 cannot supply power in step ST3, or when timeout has occurred in step ST5, the control unit 113 immediately ends the process in step ST7.

Figure 13:
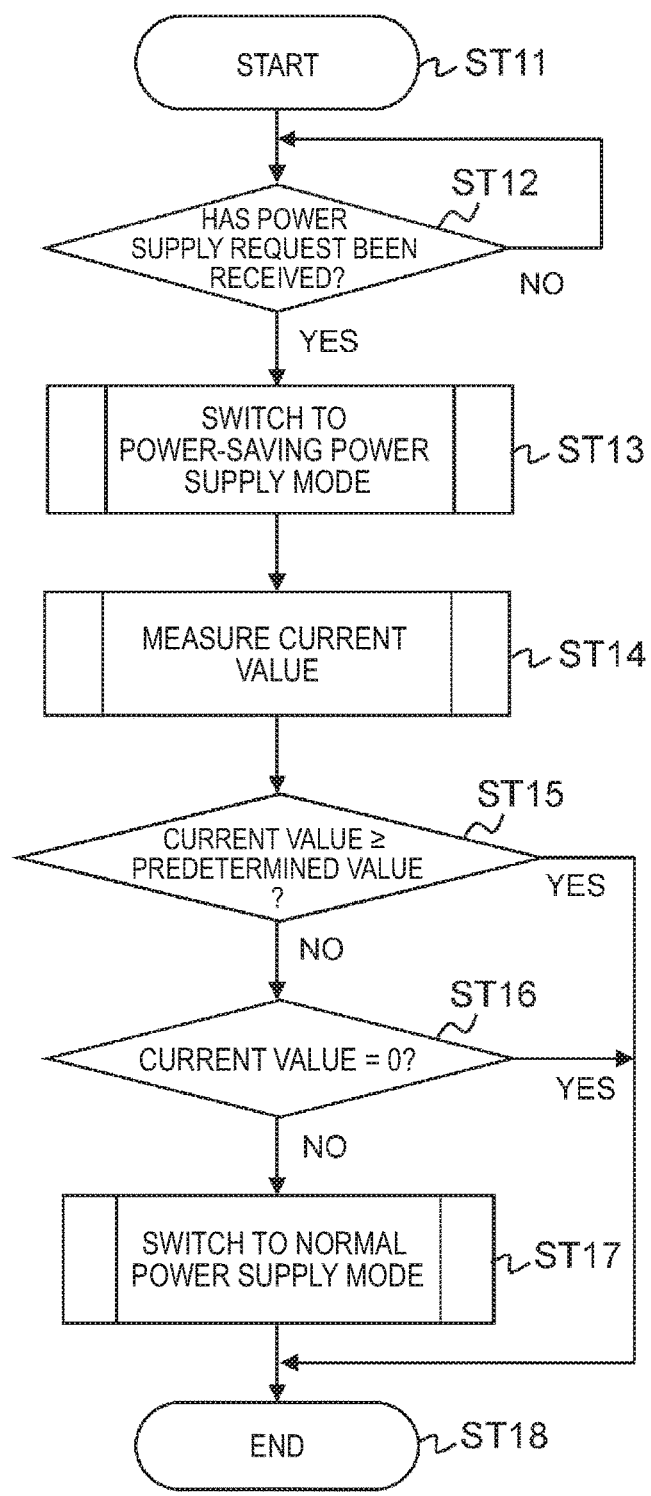
FIG. 13 is a flowchart showing an example of a process procedure performed by a control unit of a sink apparatus until power is supplied.

A flowchart of FIG. 13 shows an example of a process procedure performed by the control unit 123 of the sink apparatus 120 until power is supplied. In step ST11, the control unit 123 starts the process. Thereafter, in step ST12, the control unit 123 determines whether or not the control unit 123 has received a power supply request from the source apparatus 110.

When having received a power supply request, the control unit 123 switches to a power-saving power supply mode (in FIG. 11, the switch is switched to "3") in step ST13. Thereafter, in step ST14, the control unit 123 measures a current value using the ammeter.

Next, in step ST15, the control unit 123 determines whether or not the current value is greater than or equal to a predetermined value. If the current value is not greater than or equal to the predetermined value, the control unit 123 determines whether the current value is zero, in step ST16. If the current value is not zero, the control unit 123 switches to a normal power supply mode in step ST17 (in FIG. 11, the switch is switched to "1"). As a result, power is supplied to the source apparatus 110 through the power supply line (VCC) of the cable. After the process of step ST17, the control unit 123 ends the process in step ST18.

Also, if the current value is greater than or equal to the predetermined value in step ST15, or if the current value is zero in step ST16, the control unit 123 immediately proceeds to step ST18, and ends the process. In this case, power is not supplied from the sink apparatus 120 to the source apparatus 110.

As described above, in the AV system 100 shown in FIG. 1, the receptacle 111 of the source apparatus 110 and the receptacle 121 of the sink apparatus 120 has, in addition to the first power supply terminal (+5 V power), the second power supply terminal (VCC) having a greater current capacity than that of the first power supply terminal. Therefore, the source apparatus 110 can receive greater current power supply from the sink apparatus 120, which extends the interface function.

Also, in the AV system 100 shown in FIG. 1, the receptacle 111 of the source apparatus 110 and the receptacle 121 of the sink apparatus 120 are provided with the power supply terminal (VCC) and the ground return terminal (GND) at the end surfaces on both sides of the flat plate 132, while having the interface function of an existing receptacle having the first power supply terminal (+5 V power), without modification, on the surface of the flat plate 132.

Also, because the power supply terminal (VCC) and the ground return terminal (GND) are provided at the end surfaces on both sides of the flat plate 132, interference with other terminals can be easily avoided. Moreover, because the power supply terminal (VCC) and the ground return terminal (GND) are provided at the end surfaces on both sides of the flat plate 132, a generally microstrip structure is achieved when high-speed signal transmission is performed at other terminals, resulting in an increase in signal stability.

2. Variations

Note that, in the above embodiments, an example has been described in which the source apparatus 110 includes the power supply reception unit 115, the sink apparatus 120 includes the power supply unit 125, and power is supplied from the sink apparatus 120 to the source apparatus 110. Alternatively, the present technology can also be similarly applied to a configuration in which the sink apparatus 120 includes a power supply reception unit, the source apparatus 110 includes a power supply unit, and power is supplied from the source apparatus 110 to the sink apparatus 120.

Also, in the above embodiments, an example has been described in which the power supply terminal (VCC) and the ground return terminal (GND) are newly added to the receptacles 111 and 121 and the plugs 201 and 202 of HDMI. Alternatively, the present technology can also be similarly applied to a configuration in which the power supply terminal (VCC) portion and the ground return terminal (GND) portion are used as signal terminals.

Also, in the above embodiments, an example has been described in which the present technology is applied to a type D connector. Alternatively, the present technology can also be similarly applied to other types of connectors, i.e., type A and type C connectors.

Also, in the above embodiments, an example has been described in which the present technology is applied to an HDMI connector. Alternatively, the present technology can also be similarly applied to other similar connectors such as a USB connector and the like.

Additionally, the present technology may also be configured as below.

(1)

An electronic apparatus including:

a receptacle configured to connect to a plug of a cable for connecting the electronic apparatus to an external apparatus, wherein the receptacle includes a first power supply terminal, and a second power supply terminal having a greater current capacity than a current capacity of the first power supply terminal.

(2)

The electronic apparatus according to (1), further including:

a power supply reception unit configured to receive power supplied from the external apparatus through the second power supply terminal of the receptacle.

(3)

The electronic apparatus according to (2), further including:

a configuration/capability determination unit configured to determine whether or not the external apparatus has power supply configuration/capability; and a power supply request unit configured to, when the configuration/capability determination unit determines that the external apparatus has power supply configuration/capability, request the external apparatus to supply power, wherein the power supply reception unit receives power supplied from the external apparatus through the second power supply terminal of the receptacle in response to the power supply request from the power supply request unit.

(4)

The electronic apparatus according to (1), further including:

a power supply unit configured to supply power to the external apparatus through the second power supply terminal of the receptacle.

(5)

The electronic apparatus according to (4), further including:

a determination unit configured to, when there is a power supply request from the external apparatus, determine whether or not the electronic apparatus is capable of supplying power to the external apparatus, wherein when the determination unit determines that the electronic apparatus is capable of supplying power to the external apparatus, the power supply unit supplies power to the external apparatus through the second power supply terminal of the receptacle.

(6)

The electronic apparatus according to (5), wherein the determination unit determines whether or not the electronic apparatus is capable of supplying power to the external apparatus, on the basis of a value of a current flowing during power supply to the second power supply terminal of the receptacle.

(7)

The electronic apparatus according to any of (1) to (6), wherein, in the receptacle, the first power supply terminal is provided on a surface of a flat plate having a predetermined thickness, extends in a direction in which the plug is inserted, and has a first width, and the second power supply terminal is provided on an end surface of the flat plate, extends in the direction in which the plug is inserted, and has a width greater than the first width.

(8)

The electronic apparatus according to (7), wherein the receptacle further includes a ground terminal provided on an end surface of the flat plate opposite from the end surface having the second power supply terminal, the ground terminal extending in the direction in which the plug is inserted and having a width greater than the first width.

(9)

The electronic apparatus according to (7) or (8), wherein the second power supply terminal is formed so that at least a thickness in a direction perpendicular to the end surface becomes gradually thicker in the direction in which the plug is inserted.

(10)

The electronic apparatus according to any of (7) to (9), wherein the second power supply terminal is formed to cover the end surface and a portion of two surfaces of the flat plate contiguous with the end surface.

(11)

The electronic apparatus according to any of (1) to (10), further including:

a transmission unit configured to transmit a content to the external apparatus through the receptacle.

(12)

The electronic apparatus according to (11), wherein the transmission unit transmits the content to the external apparatus through the receptacle using a differential signal.

(13)

The electronic apparatus according to (12), wherein the transmission unit is an HDMI transmission unit.

(14)

The electronic apparatus according to any of (1) to (10), further including:

a reception unit configured to receive a content from the external apparatus through the receptacle.

(15)

The electronic apparatus according to (14), wherein the reception unit receives the content from the external apparatus through the receptacle using a differential signal.

(16)

The electronic apparatus according to (15), wherein the reception unit is an HDMI reception unit.

(17)

A power supply reception method for use in an electronic apparatus including a receptacle configured to connect to a plug of a cable for connecting the electronic apparatus to an external apparatus, the receptacle including a first power supply terminal, and a second power supply terminal having a greater current capacity than a current capacity of the first power supply terminal, the method including:

a configuration/capability determination step of determining whether or not the external apparatus has power supply configuration/capability;

a power supply request step of, when it is determined in the configuration/capability determination step that the external apparatus has power supply configuration/capability, requesting the external apparatus to supply power; and a power supply reception step of receiving power supplied from the external apparatus through the second power supply terminal of the receptacle in response to the power supply request of the power supply request step.

(18)

A power supply method for use in an electronic apparatus including a receptacle configured to connect to a plug of a cable for connecting the electronic apparatus to an external apparatus, the receptacle including a first power supply terminal, and a second power supply terminal having a greater current capacity than a current capacity of the first power supply terminal, the method including:

a power supply request reception step of receiving a power supply request from the external apparatus;

a determination step of, when receiving the power supply request in the power supply request reception step, determining whether or not the electronic apparatus is capable of supplying power to the external apparatus; and a power supply step of, when it is determined in the determination step that the electronic apparatus is capable of supplying power to the external apparatus, supplying power to the external apparatus through the second power supply terminal of the receptacle.

(19)
A cable including:
a signal line configured to transmit a content;
a first power supply line; and
a second power supply line having a greater current capacity than a current capacity of the first power supply line.

(20)
An electronic apparatus including:
a receptacle configured to connect to a plug of a cable for connecting the electronic apparatus to an external apparatus,
wherein the receptacle includes a predetermined number of first signal terminals provided on a surface of a flat plate and extending in a direction in which the plug is inserted, and a second signal terminal provided on one or both of end surfaces of the flat plate and extending in the direction in which the plug is inserted.

REFERENCE SIGNS LIST

81 HDMI transmitter
82 HDMI receiver
100 AV system
110 source apparatus
111 receptacle
112 data transmission unit
113 control unit
115 power supply reception unit
120 sink apparatus
121 receptacle
122 data reception unit
123 control unit
125 power supply unit
130, 130A receptacle
131 outer housing
132 flat plate
200 cable
201, 202 plug
230, 230A plug
231 outer housing
232 pipe-shaped member

The invention claimed is:

1. An electronic apparatus, comprising:
a receptacle configured to connect to a plug of a cable that connects the electronic apparatus to an external apparatus;
a flat plate, of a particular thickness, that extends in a direction in which the plug is inserted, wherein the flat plate is included in the receptacle;
a first power supply terminal, of a first current capacity, is on a surface of the flat plate; and
a second power supply terminal, of a second current capacity, is on a first end surface of the flat plate,
wherein the second current capacity is greater than the first current capacity, and
wherein the second power supply terminal covers the first end surface and a portion of two surfaces of the flat plate contiguous with the first end surface.

2. The electronic apparatus according to claim 1, further comprising circuitry configured to receive power supplied from the external apparatus through the second power supply terminal of the receptacle.

3. The electronic apparatus according to claim 2, wherein the circuitry is further configured to:
determine a power supply configuration/capability of the external apparatus;
transmit a request to the external apparatus to supply power based on the determination of the power supply configuration/capability; and
receive the power supplied from the external apparatus through the second power supply terminal.

4. The electronic apparatus according to claim 1, further comprising circuitry configured to supply power to the external apparatus through the second power supply terminal of the receptacle.

5. The electronic apparatus according to claim 4, wherein the circuitry is further configured to:
determine a power supply configuration/capability of the electronic apparatus based on a power supply request from the external apparatus; and
control the electronic apparatus to supply power to the external apparatus through the second power supply terminal of the receptacle based on the determination of the power supply configuration/capability.

6. The electronic apparatus according to claim 5, wherein the circuitry is further configured to determine the power supply configuration/capability of the electronic apparatus based on a value of a current that flows during power supply to the second power supply terminal of the receptacle.

7. The electronic apparatus according to claim 1,
wherein the receptacle further includes a ground terminal on a second end surface of the flat plate that is opposite from the first end surface.

8. The electronic apparatus according to claim 7, wherein
the first power supply terminal has a first width and the second power supply terminal has a second width, and
the second width is greater than the first width.

9. The electronic apparatus according to claim 8, wherein
a third width of the ground terminal is greater than the first width, and
the second width is equal to the third width.

10. The electronic apparatus according to claim 1,
wherein a thickness of the second power supply terminal, in a direction perpendicular to the first end surface, increases in the direction in which the plug is inserted.

11. The electronic apparatus according to claim 1, further comprising circuitry configured to transmit content to the external apparatus through the receptacle.

12. The electronic apparatus according to claim 11, wherein the circuitry is further configured to transmit the content to the external apparatus through the receptacle based on a differential signal.

13. The electronic apparatus according to claim 12, wherein the circuitry is further configured to transmit the content through a High-Definition Multimedia Interface (HDMI) transmitter.

14. The electronic apparatus according to claim 1, further comprising circuitry configured to receive content from the external apparatus through the receptacle.

15. The electronic apparatus according to claim 14, wherein the circuitry is further configured to receive the content from the external apparatus through the receptacle based on a differential signal.

16. The electronic apparatus according to claim 15, wherein the circuitry is further configured to receive the content through a High-Definition Multimedia Interface (HDMI) receiver.

17. The electronic apparatus according to claim 1, wherein the second power supply terminal has a cross section of U shape.

18. A power supply reception method, comprising:
in an electronic apparatus that includes a receptacle:
connecting the receptacle to a plug of a cable that connects the electronic apparatus to an external apparatus,
wherein the receptacle includes a flat plate of a particular thickness that extends in a direction in which the plug is inserted,
wherein a first power supply terminal, of a first current capacity, is on a surface of the flat plate and a second power supply terminal, of a second current capacity, is on a first end surface of the flat plate,
wherein the second current capacity is greater than the first current capacity, and
wherein the second power supply terminal covers the first end surface and a portion of two surfaces of the flat plate contiguous with the first end surface;
determining a power supply configuration/capability of the external apparatus;
transmitting a request to the external apparatus to supply power based on the determination of the power supply configuration/capability; and
receiving the power supplied from the external apparatus through the second power supply terminal.

19. A power supply method, comprising:
in an electronic apparatus that includes a receptacle:
connecting the receptacle to a plug of a cable that connects the electronic apparatus to an external apparatus,
wherein the receptacle includes a flat plate of a particular thickness that extends in a direction in which the plug is inserted,
wherein a first power supply terminal of a first current capacity is on a surface of the flat plate and a second power supply terminal of a second current capacity is on a first end surface of the flat plate,
wherein the second current capacity is greater than the first current capacity, and
wherein the second power supply terminal covers the first end surface and a portion of two surfaces of the flat plate contiguous with the first end surface;
receiving a power supply request from the external apparatus;
determining a power supply configuration/capability of the electronic apparatus based on the received power supply request; and
controlling the electronic apparatus to supply power to the external apparatus through the second power supply terminal of the receptacle based on the determination of the power supply configuration/capability.

20. A cable, comprising:
a plug that connects an electronic apparatus to an external apparatus,
wherein the plug includes a flat plate, of a particular thickness, that extends in a direction in which the plug is inserted,
wherein a first power supply terminal of a first current capacity is on a surface of the flat plate and a second power supply terminal of a second current capacity is on a first end surface of the flat plate,
wherein the second current capacity is greater than the first current capacity, and
wherein the second power supply terminal covers the first end surface and a portion of two surfaces of the flat plate contiguous with the first end surface;
a signal line configured to transmit content;
a first power supply line connected to the first power supply terminal; and
a second power supply line connected to the second power supply terminal,
wherein a current capacity of the second power supply line is greater than a current capacity of the first power supply line.

21. An electronic apparatus, comprising:
a receptacle configured to connect to a plug, of a cable, that connects the electronic apparatus to an external apparatus,
wherein the receptacle includes a flat plate, of a particular thickness, that extends in a direction in which the plug is inserted,
wherein a first power supply terminal of a first plurality of signal terminals is on a surface of the flat plate and a second power supply terminal of a second plurality of signal terminals is on an end surface of the flat plate, and
wherein the second power supply terminal covers the first end surface and a portion of two surfaces of the flat plate contiguous with the first end surface.

* * * * *